United States Patent Office 3,440,993
Patented Apr. 29, 1969

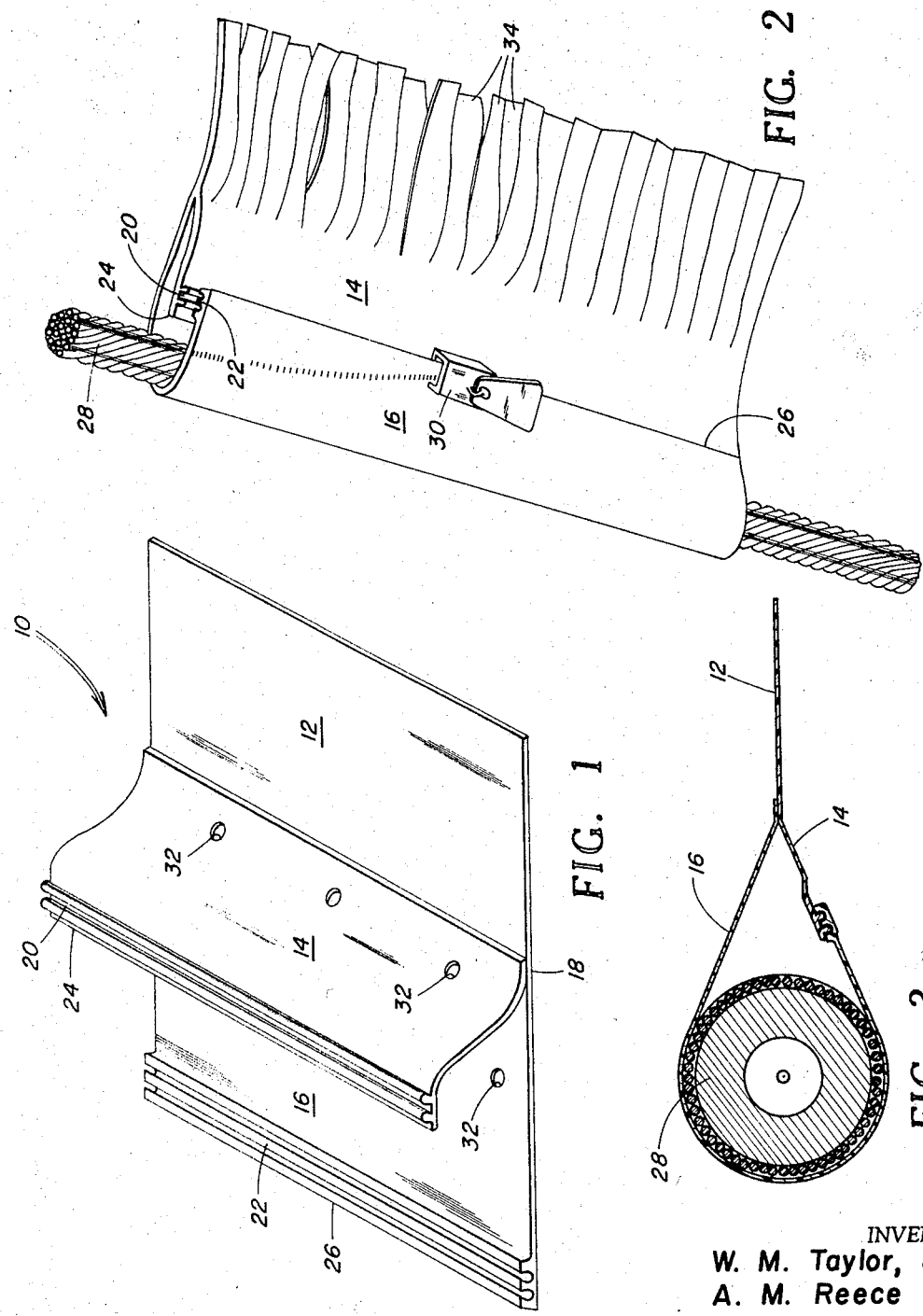
April 29, 1969 W. M. TAYLOR, JR., ET AL 3,440,993
CABLE FAIRING
Filed Dec. 26, 1967 Sheet 1 of 2
INVENTORS
W. M. Taylor, Jr
A. M. Reece

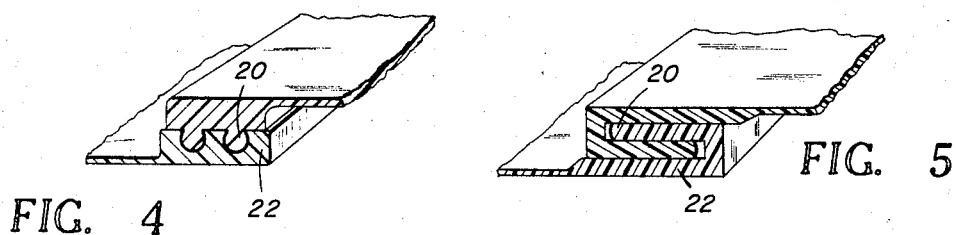
FIG. 4
FIG. 5
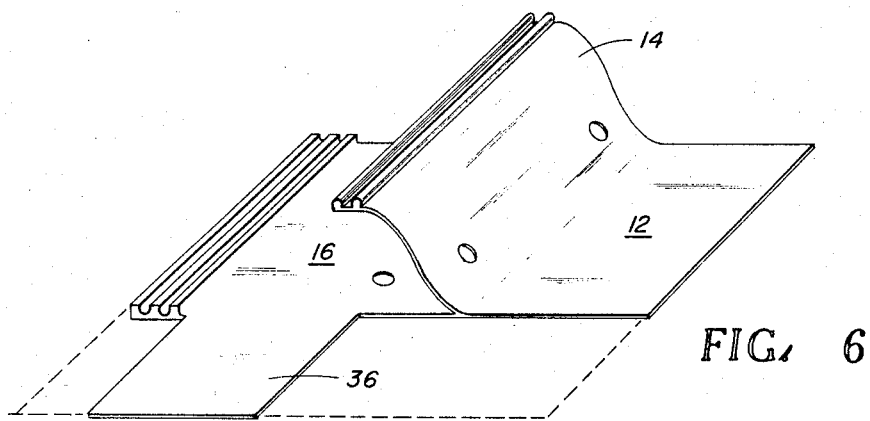
FIG. 6
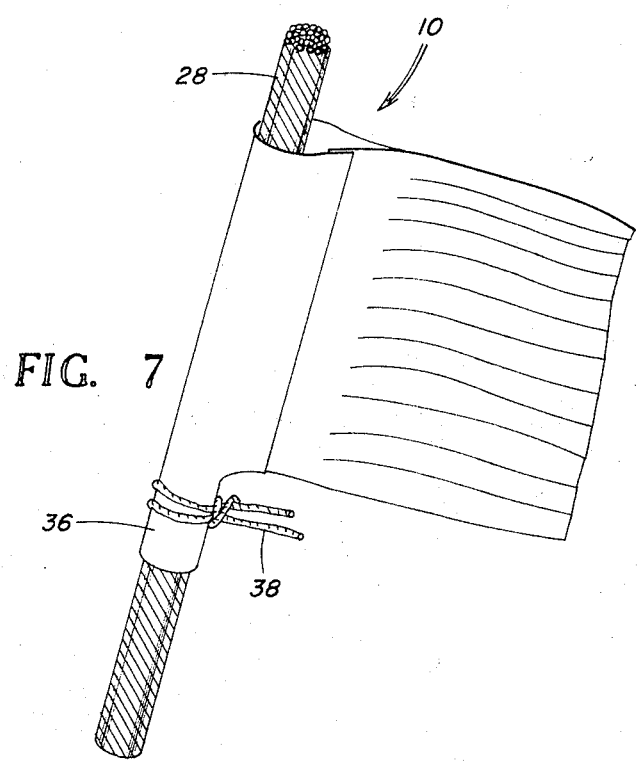
FIG. 7

3,440,993
CABLE FAIRING
Wallace M. Taylor, Jr., Plantation, and Asa M. Reece, Fort Lauderdale, Fla., assignors to the United States of America as represented by the Secretary of the Navy
Filed Dec. 26, 1967, Ser. No. 693,399
Int. Cl. B63b 17/00
U.S. Cl. 114—235                 2 Claims

ABSTRACT OF THE DISCLOSURE

A cable fairing for reducing drag and vibrations of submerged oceanographic cables wherein a thin flexible trailing member is attached to the cable to provide a streamline configuration thereto. Secured to the forward portion of the trailing member are a pair of corrosive resistant thin flexible flat members having complementary interlocking surfaces for quick attachment about the cable.

Background of the invention

This invention relates generally to apparatus for reducing drag and vibrations of submerged cables and more particularly to a flexible corrosive resistant cable fairing.

Marine oceanographic operations utilize submerged wire rope or cable to tow delicate instrument packages at various depths and speeds for experimental purposes. When bare unfaired cables are used to tow an instrument array or assembly, the two vehicle must be operated at relatively slow speeds in order to maintain proper instrument depth and not exceed tolerable tow wire vibration. Cable fairing drastically reduces vibration and drag, thus permitting a deeper tow for a given instrument package, length of cable and speed.

Several diverse arrangements have been heretofore proposed to provide towing cables with a streamline cross sectional shape to reduce drag and vibration problems. Rigid articulated streamline sections that make up the cable or chain itself have been utilized in the past, but these devices experience stress, weight, assembly and corrosion problems which are highly undesirable in experimental work. Short lengths of streamline fairings fastened to a wire rope one after the other to form a continuous streamline tow cable have been utilized, but since these devices must be bolted to the cable or snapped on the cable, undesirable tow line conditions exist. Many of the prior art cable fairings are not completely flexible and thus creates stresses on the cable which alter the natural curve of the cable under tow conditions and also create storage and assembly problems which would not exist with a completely flexible fairing. Furthermore, prior art fairings have been assembled to the cable by use of bolts, clamps or snap on devices making assembly difficult and time consuming and causing damage to the cable itself. When metallic fastening devices are utilized for securing the fairing to the cable corrosion problems arise due to the galvanic action with the cable or instrument package.

Summary of the invention

Accordingly, one object of this invention is to provide a new and improved completely flexible corrosive resistant cable fairing.

Another object of the invention is the provision of a new and improved cable fairing which is quickly and easily installable upon an oceanographic cable.

Still another object of the present invention is the provision of a cable fairing which is useable with a variety of sizes and types of cables.

A still further object of this invention is the provision of a cable fairing which follows the natural curvature of a tow cable without imposing additional stresses on the cable.

One other object of this invention is the provision of a novel light weight flexible cable fairing of corrosive resistant material which is storable in a minimum volume of space.

Briefly, in accordance with one embodiment of this invention, these and other objects are attained by providing a cable fairing having a thin flexible sheet of corrosive resistant material with an integral bifurcated forward portion and a trailing edge portion wherein the forward bifurcated portion forms a pair of flap members having complementary interlocking devices formed at the terminal ends such that the flap members form an encircling band for containing the cable when the interlocking means are engaged and form a substantially flat surface when the interlocking means are not engaged.

Brief description of the drawings

A more complete appreciation of the invention and many of the attended advantages thereof will be readily appreciated as the same becomes better understood by reference to the following detailed description when considered in connection with the accompanying drawings wherein:

FIG. 1 is a view in perspective showing a short strip of one embodiment of the cable fairing of the instant invention;

FIG. 2 is a pictorial view showing the manner in which the cable fairing is attached to a cable;

FIG. 3 is an end elevation of the cable fairing of the instant invention attached to a cable shown in section;

FIGS. 4 and 5 are partial sectional views showing various complementary interlocking surfaces utilized for securing the cable fairing about the cable;

FIG. 6 is a perspective view of a modified form of the cable fairing shown in FIG. 1; and, FIG. 7 is a pictorial view of the cable fairing of FIG. 6 in the attached position about the cable.

Description of the preferred embodiment

Referring now to the drawings wherein like reference characters designate identical or corresponding parts throughout the several views and more particularly to FIG. 1 thereof wherein the cable fairing of the present invention indicated generally at 10 is shown as consisting essentially of a trailing edge portion 12 and a pair of flat members 14 and 16 integrally connected at a bifurcated portion 18. The entire cable fairing 10 is constructed of thin flexible corrosive resistant sheet material such as plastic or cloth. Complementary interlocking surface portion 20 and 22 are formed on the respective terminal ends 24 and 26 of flap members 14 and 16. Referring to FIG. 2, it can be seen that the cable fairing 10 is attached to a cable 28 by encircling the cable with flap member 16 to bring complementary interlocking portions 20 and 22 into engagement. A conventional slide fastener 30 is used to engage surfaces 20 and 22, thus creating an encircling band for containing the cable 28. Apertures 32, shown in FIG. 1, are provided on the flap members adjacent the bifurcated portion 18 for insuring that fluid does not become entrapped within the enclosed cable fairing when attached about the cable 28. As seen in FIG. 2, the trailing edge portion 12 may be divided into small fringes 34. For ease in installation the flap member 14 is substantially shorter than the flap member 16 such that the end portions 24 and 26 do not coincide with the cable 28 when flap member 16 is wrapped about the cable. The fairing 10 may be of any desired length, but is preferably constructed of one continuous strip having an axial extend coinciding with substantially the entire length of submerged cable. FIG. 3 clearly illustrated the cable fairing as it would appear in the installed position during towing, and FIGS. 4 and 5 show various interlocking surface portions, known in the prior art, which may be utilized with the present invention.

A panel member 36, shown in FIGS. 6 and 7, is provided as an integral portion of flap 16 such that when the flap member 16 is wrapped about the cable 28 the panel member 36 may be secured to the cable by means of a cord 38 to prevent the cable fairing 10 from shifting position along the cable.

Obviously numerous modifications and variations of the present invention are possible in the light of the above teachings. It is therefore to be understood that the invention may be practiced otherwise than as specifically described herein.

What is claimed as new and desired to be secured by Letters Patent of the United States is:

1. A cable fairing comprising:
    a thin flexible plastic sheet having an integral bifurcated portion and a fringed trailing edge portion, said bifurcated forward portion comprising a pair of flap members of different lengths having complementary interlocking surface portions formed along the terminal edges thereof for forming an enclosing band about a cable when said interlocking portions are engaged and forming a substantially flat surface when said interlocking portions are not engaged, and a thin panel member integral with and in the same plane as said longer flap member and terminating short of said interlocking portion and said bifurcated portion.

2. The apparatus of claim 1 wherein said flap members are apertured adjacent said bifurcated portion.

References Cited
UNITED STATES PATENTS

| | | | |
|---|---|---|---|
| 2,397,957 | 4/1946 | Freeman | 114—235 |
| 3,147,729 | 9/1964 | Barnard | 114—103 X |

TRYGVE M. BLIX, *Primary Examiner.*